United States Patent
Wright

(10) Patent No.: US 7,344,185 B2
(45) Date of Patent: Mar. 18, 2008

(54) APPLIED LOAD DISPLACEMENT STRUCTURE FOR PILLAR GARNISH

(75) Inventor: Sean Anthony Wright, Livonia, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 0 days.

(21) Appl. No.: 11/530,559

(22) Filed: Sep. 11, 2006

(65) Prior Publication Data

US 2007/0182191 A1 Aug. 9, 2007

Related U.S. Application Data

(60) Provisional application No. 60/771,002, filed on Feb. 7, 2006.

(51) Int. Cl.
*B60J 7/00* (2006.01)
(52) U.S. Cl. .................... 296/187.05; 296/39.1
(58) Field of Classification Search ........... 296/187.05, 296/39.1, 1.08, 203.03; 280/730.2, 751, 280/728.2, 743.1
See application file for complete search history.

(56) References Cited

U.S. PATENT DOCUMENTS

| | | | | |
|---|---|---|---|---|
| 4,472,918 A | * | 9/1984 | Mach | 52/511 |
| 4,579,368 A | * | 4/1986 | Kawade et al. | 280/801.2 |
| 4,940,254 A | * | 7/1990 | Ueno | 280/801.2 |
| 4,971,359 A | * | 11/1990 | Takahashi et al. | 296/203.03 |
| 5,409,262 A | | 4/1995 | McLennan | |
| 5,421,615 A | * | 6/1995 | Asagiri et al. | 280/808 |
| 5,529,344 A | * | 6/1996 | Yasui et al. | 280/808 |
| 5,609,385 A | | 3/1997 | Daniel et al. | |
| 5,641,195 A | * | 6/1997 | Patel et al. | 296/187.05 |
| 5,779,270 A | * | 7/1998 | Tanaka | 280/808 |
| 5,863,069 A | * | 1/1999 | Wickenheiser et al. | 280/808 |
| 5,938,273 A | | 8/1999 | Williams et al. | |
| 6,007,100 A | * | 12/1999 | Steffens, Jr. | 280/808 |
| 6,059,311 A | * | 5/2000 | Wipasuramonton et al. | 280/730.2 |
| 6,059,342 A | | 5/2000 | Kawai et al. | |
| 6,126,231 A | * | 10/2000 | Suzuki et al. | 296/187.05 |
| 6,199,907 B1 | * | 3/2001 | Mugford et al. | 280/751 |
| 6,264,238 B1 | | 7/2001 | MacDonald et al. | |
| 6,343,831 B1 | | 2/2002 | Nabert et al. | |
| 6,592,143 B2 | | 7/2003 | Takahashi et al. | |
| 6,908,144 B2 | | 6/2005 | Götzinger et al. | |
| 6,983,967 B2 | | 1/2006 | Scheidmantal et al. | |
| 2005/0242563 A1 | * | 11/2005 | Daume et al. | 280/801.2 |
| 2007/0114766 A1 | * | 5/2007 | Hwang | 296/39.1 |

\* cited by examiner

*Primary Examiner*—Kiran B. Patel
(74) *Attorney, Agent, or Firm*—Gifford, Krass, Sprinkle, Anderson & Citkowski, P.C.

(57) ABSTRACT

A garnish assembly for an automotive pillar having a garnish dimensioned to cover the pillar and in which the garnish has a predetermined thickness and an elongated through slot. A spacer is disposed in the slot while a fastener extends through the spacer and is secured to the pillar. The spacer has a length at least as long as the predetermined thickness of the garnish and a cross-sectional shape smaller than the area of the slot so that the garnish is slidable relative to the spacer. The fastener may also be used to secure a handgrip to the pillar.

8 Claims, 2 Drawing Sheets

APPLIED LOAD DISPLACEMENT STRUCTURE FOR PILLAR GARNISH

RELATED APPLICATION

This application claims priority of U.S. Provisional Patent Application Ser. No. 60/771,002 filed Feb. 7, 2006, which is incorporated herein by reference.

BACKGROUND OF THE INVENTION

I. Field of the Invention

The present invention relates generally to automotive vehicles and, more particularly, to a garnish assembly for an automotive pillar having an applied load displacement structure.

II. Description of Relevant Art

In modern day automotive vehicles, the automotive frame pillars are covered by a decorative garnish. This garnish is typically made of a synthetic material, such as a polymeric material.

Such automotive vehicles further typically include handgrips that are attached to the pillar to facilitate the entry and exit of passengers from the passenger compartment of the vehicle. These handgrips are conventionally bolted to a bracket secured to the pillar so that the fastener extends both through the handle and garnish and simultaneously secures both the garnish and handgrip to the bracket and thus to the pillar.

There are governmental safety regulations that require that the garnish cushion head impacts of the type that may occur during an automotive accident. In order to meet such governmental regulations, the previously known automotive vehicles have included padded areas attached to or formed as a part of the pillar garnish.

Such padded areas on the garnish have proven sufficient to meet the government safety regulations, but disadvantageously increase the overall cost of the garnish as well as the weight of the garnish. Such increased weight of the garnish, in turn, adversely affects the overall efficiency and fuel economy for the vehicle.

SUMMARY OF THE PRESENT INVENTION

The present invention provides a garnish assembly for an automotive pillar which overcomes all of the above-mentioned disadvantages of the previously known devices.

In brief, the garnish assembly of the present invention includes a garnish dimensioned to cover the frame pillar of the automotive vehicle. This garnish, furthermore, has a predetermined thickness as well as an elongated slot formed through the garnish.

A spacer having a length at least as long as the thickness of the garnish is then disposed through the slot such that the spacer is aligned with a fastener opening in the pillar, such as a bolt hole formed in a bracket attached to the pillar. The spacer, furthermore, is formed from a rigid material, such as metal, and has a cross-sectional area smaller than the area of the slot so that the garnish is slidable relative to the spacer.

In operation, a fastener, such as a bolt, is disposed through the spacer so that the fastener engages the fastener opening formed in the pillar bracket. The fastener is preferably a bolt and, upon tightening, the bolt compresses the spacer between the bolt head and the pillar bracket without compressing the garnish against the pillar bracket. Consequently, the garnish remains slidable relative to the spacer despite tightening of the fastener.

In operation, an impact to the garnish creates a compressive force in the garnish. Upon receipt of such a compressive force, the garnish slides relative to the spacer thus effectively cushioning the impact against the garnish in the desired fashion.

Optionally, the fastener is also used to secure a handgrip to the pillar. In this event, the fastener extends through registering openings in both the handgrip and the spacer so that, upon tightening of the fastener, the handgrip is firmly attached to the vehicle pillar while the garnish remains slidable within the limits of its slot relative to the spacer in the desired fashion.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
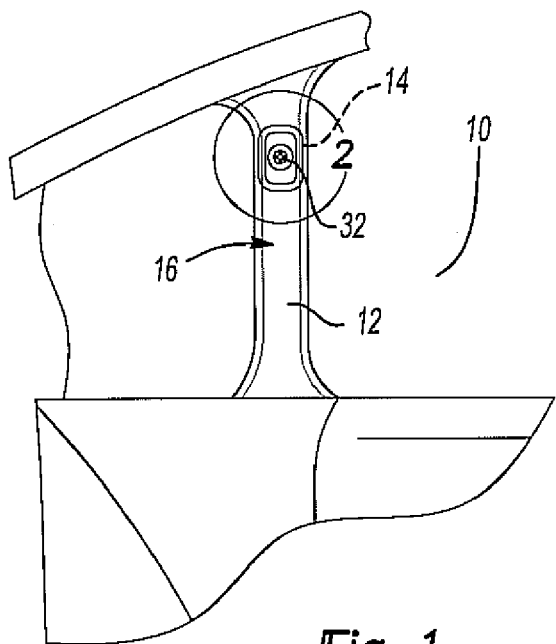
FIG. 1 is an elevational view illustrating a preferred embodiment of the present invention.
Figure 2:
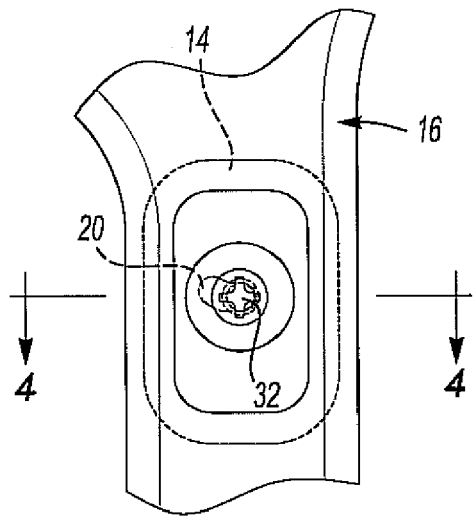
FIG. 2 is an enlarged fragmentary plan view.

With reference first to FIG. 1, an automotive vehicle 10 having a frame pillar 12 extending along one side of a passenger compartment for the vehicle 10 is shown. This automotive pillar 12 is constructed of a rigid material, typically metal, and may have one or more brackets 14 attached to it. These brackets 14 are typically used to mount automotive accessories of some sort to the vehicle pillar 12.

Figure 3:
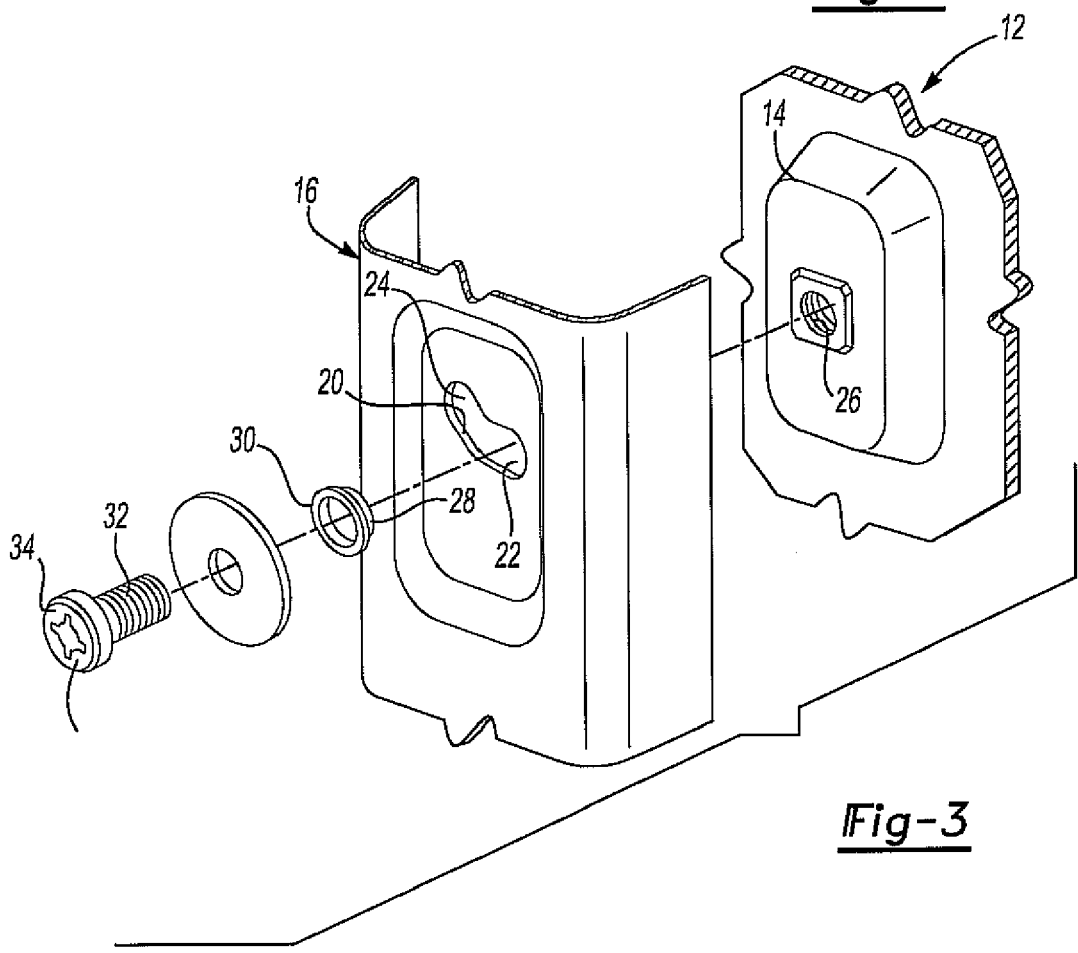
FIG. 3 is an exploded fragmentary elevational view.
Figure 4:
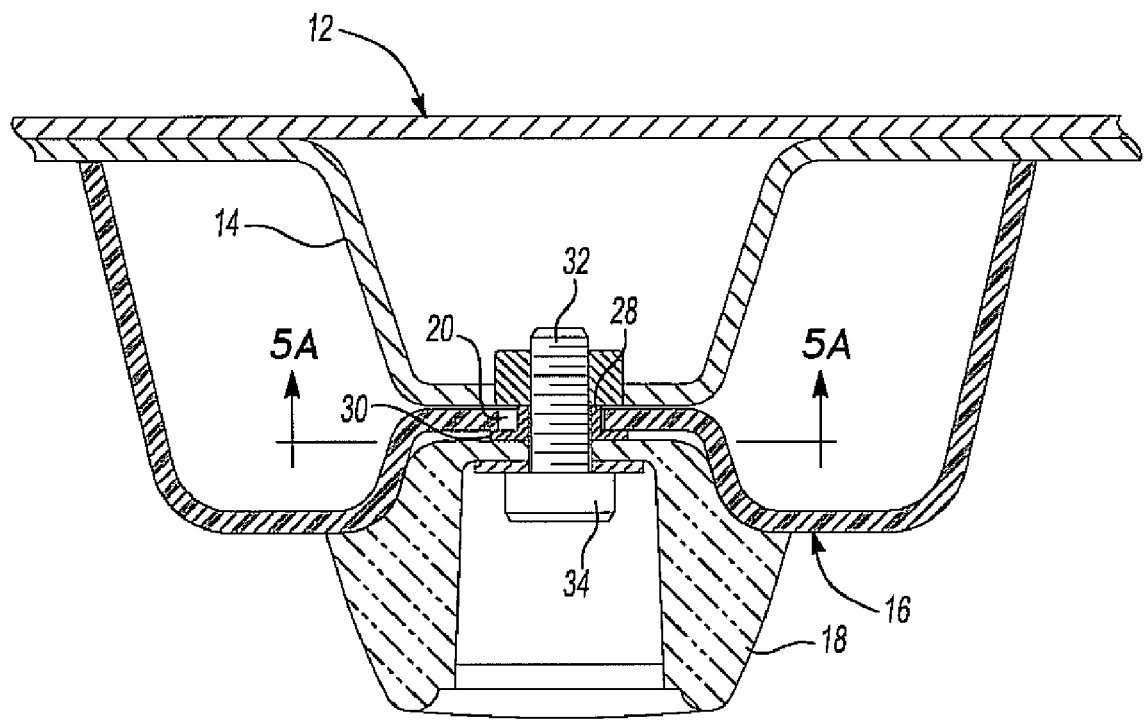
FIG. 4 is a sectional view taken substantially along line 4-4 in FIG. 2 and enlarged for clarity.

Referring to FIGS. 3 and 4, the automotive pillar 12 is covered by a decorative garnish 16. This decorative garnish 16 is typically constructed of a synthetic polymeric material, such as plastic, and is dimensioned to cover the pillar 12 as well as any brackets 14 which may be attached to the pillar 12. Additionally, a handgrip 18 (FIG. 4) may also be attached to the garnish 16 in order to facilitate the entry and exit of passengers into and from the passenger compartment for the vehicle 10.

Figure 5A:
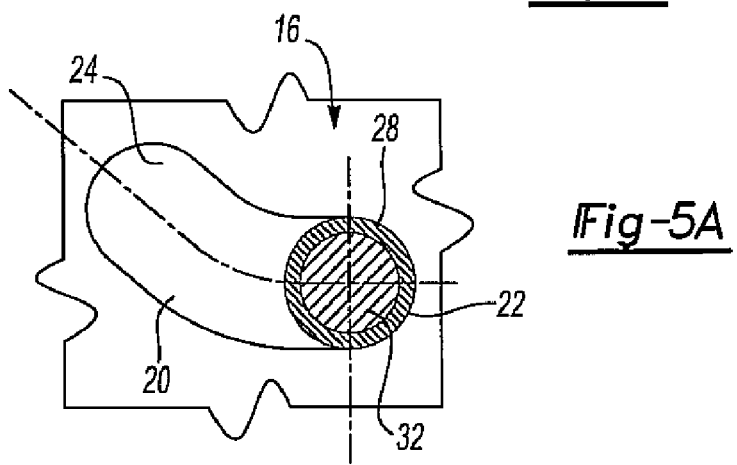
FIGS. 5A and 5B are diagrammatic views illustrating the operation of the present invention.
Figure 5B:
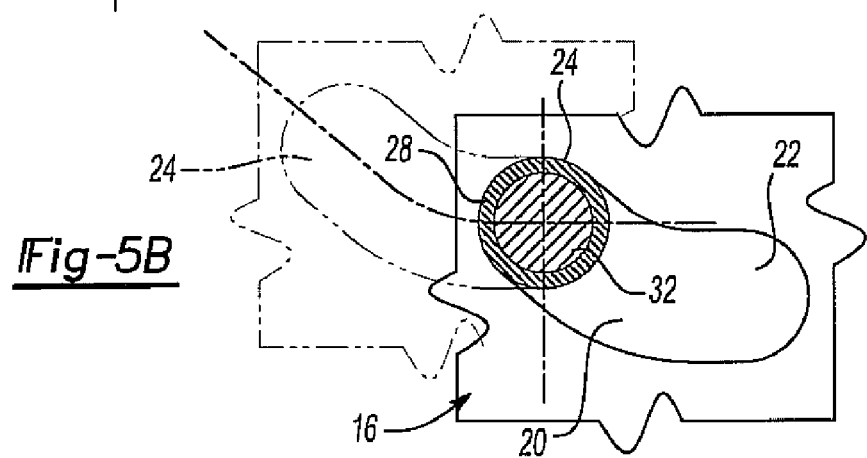

The garnish 16 is relatively thin walled and has a predetermined thickness along at least a portion of the garnish 16. An elongated slot 20 is also formed through the garnish 16 and, as best shown in FIGS. 5A and 5B, this slot 20 is generally V-shaped. As such, the slot 20 has two generally linear legs 22 and 24 which intersect each other at an obtuse angle.

Referring again to FIGS. 3 and 4, in order to attach the garnish 16 to the pillar bracket 14, the garnish 16 is positioned over the pillar bracket 14 until the slot 20 is aligned with a fastener opening 26, typically a threaded hole, in the bracket 14. A rigid spacer 28, typically constructed of metal, is then positioned through the garnish slot 20 so that the spacer 28 is aligned with the fastener opening 26 in the bracket 14.

The spacer 28 is preferably tubular in shape and has an axial length at least as long as the thickness of the garnish 16. Additionally, the spacer 28 preferably has an outwardly extending rim 30 which overlies a portion of the garnish 16 along the sides of the slot 20.

With the spacer 28 aligned with the fastener opening 26, a fastener 32, such as a bolt, is inserted through both the spacer 28, garnish slot 20 and into the fastener opening 26 and tightened in the conventional fashion. Upon tightening, the fastener 32 compresses the spacer 18 between a head 34 of the fastener 32 and the pillar bracket 14. However, since the axial length of the spacer 28 is at least as great as the thickness of the garnish 16, the garnish 16 is still freely slidable relative to the fastener 32 despite tightening of the fastener 32.

As shown in FIG. 4, the fastener 32 may also be used to secure the handgrip 18 to the pillar bracket 14. In this event, the fastener 32 extends through registering openings in the handgrip 18, the spacer 28 and the slot 20. Furthermore, although the fastener 32 has been described as a bolt, it will be understood that other types of fasteners may alternatively be used without deviation from the scope or spirit of the invention.

With reference now to FIGS. 5A and 5B, the operation of the present invention will be described. In FIG. 5A, the fastener, and thus the spacer 28, is positioned adjacent one end of the slot 20 during normal operation of the vehicle 10. In this situation, the garnish 16 covers the pillar 12 as desired and the handgrip 18, if present, may be used as required.

However, in the event of an impact to the garnish 16 as illustrated in FIG. 4B, such an impact imposes a compressive force on the garnish 16. This compressive force, in turn, causes the garnish 16 to slide relative to the fastener 32 thus both cushioning the impact against the garnish 16 and simultaneously protecting the garnish 16 from damage from the impact. Once the compressive force ceases, the garnish 16 may return to its non-impact position illustrated in FIG. 5A. Furthermore, the V-shape of the slot 20 allows the garnish 16 to cushion against both the vertical and horizontal components of any impact from the passenger compartment of the vehicle 10.

From the foregoing, it can be seen that the present invention provides a simple and yet highly effective garnish assembly which not only cushions impacts against the garnish as desired, but also protects the garnish from damage in the event of such an impact. Having described my invention, however, many modifications thereto will become apparent to those skilled in the art to which it pertains without deviation from the spirit of the invention as defined by the scope of the appended claims.

I claim:

1. A garnish assembly for an automotive pillar comprising:
    a garnish dimensioned to cover the pillar, said garnish having a predetermined thickness and an elongated slot,
    a spacer disposed in said slot,
    a fastener extending through said spacer and secured to said pillar,
    wherein said spacer has a length at least as long as said predetermined thickness of said garnish and a cross-sectional shape smaller than an area of said slot so that said garnish is slidable relative to said spacer.

2. The invention as defined in claim 1 wherein said slot is V-shaped.

3. The invention as defined in claim 2 wherein said V-shaped slot includes two substantially linear legs which intersect at an obtuse angle.

4. The invention as defined in claim 1 wherein said fastener comprises a bolt which engages a threaded hole in the pillar.

5. The invention as defined in claim 1 and comprising a handle having a mounting hole, and wherein said fastener extends through said handle mounting hole.

6. The invention as defined in claim 1 wherein said spacer is tubular in shape and includes an outwardly extending rim at one end, said rim overlying a portion of said garnish adjacent said slot.

7. The invention as defined in claim 1 wherein said spacer is made of metal.

8. The invention as defined in claim 1 wherein the pillar includes a mounting bracket and wherein said fastener is secured to said mounting bracket.

* * * * *